Figure 1:
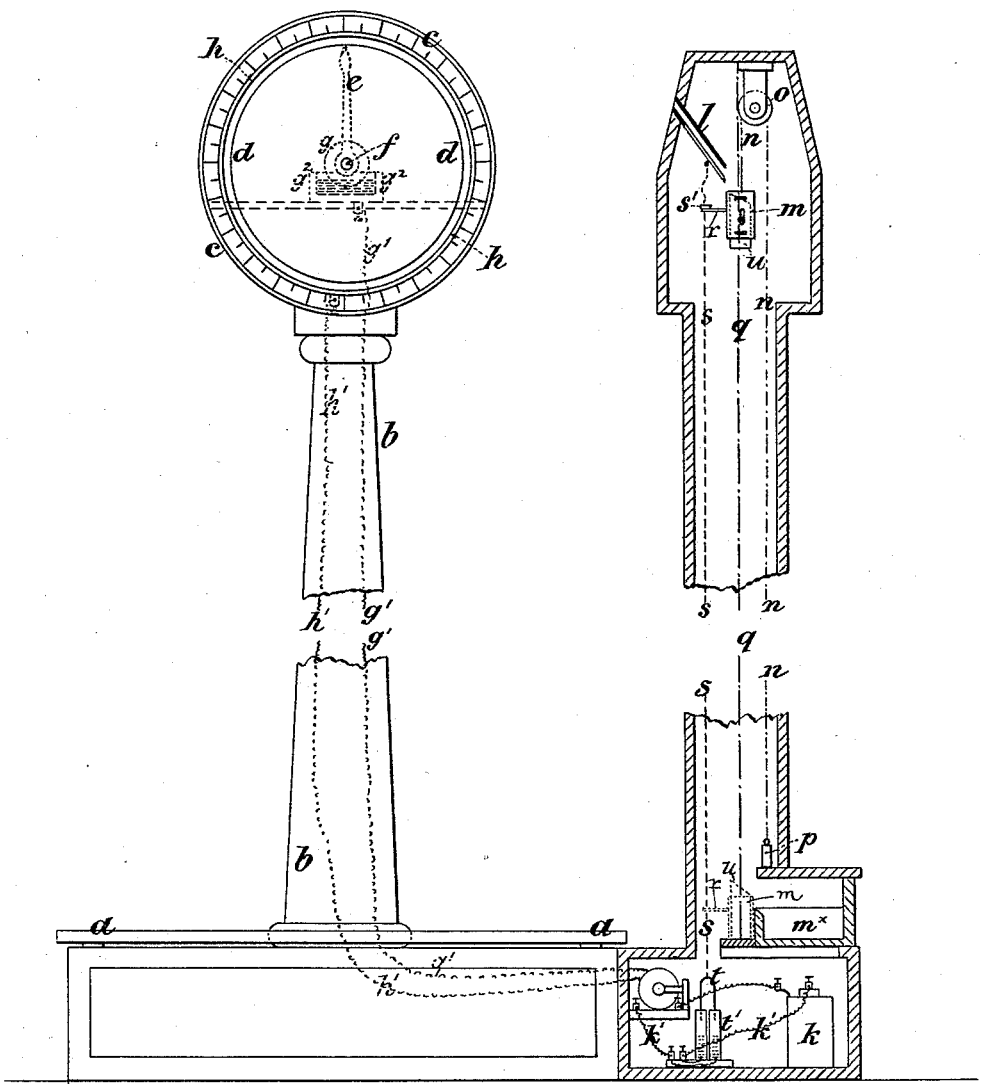

(No Model.) 2 Sheets—Sheet 1.

F. C. LYNDE.
COIN CONTROLLED INDICATING APPARATUS.

No. 398,521. Patented Feb. 26, 1889.

Witnesses
Rufus H. Skeel
Wm Chester Wells

Inventor
F. C. Lynde
by his attorneys
Howson and Howson (No Model.) 2 Sheets—Sheet 2.
F. C. LYNDE.
COIN CONTROLLED INDICATING APPARATUS.
No. 398,521. Patented Feb. 26, 1889.
FIG: 2.
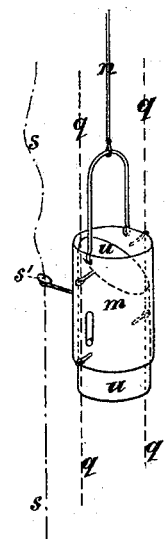
FIG: 4.
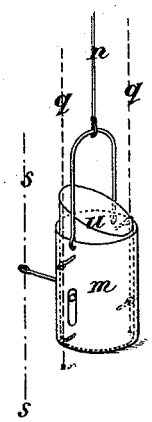
FIG: 3.
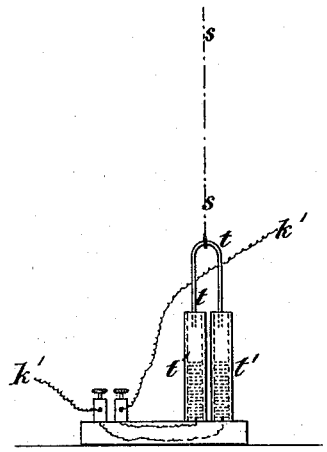
Witnesses.
Rufus H. Skeel
Wm Chester Wells
Inventor:
F. C. Lynde
by his attorneys
Howson and Howson

UNITED STATES PATENT OFFICE.

FREDERICK C. LYNDE, OF MANCHESTER, COUNTY OF LANCASTER, ENGLAND.

COIN-CONTROLLED INDICATING APPARATUS.

SPECIFICATION forming part of Letters Patent No. 398,521, dated February 26, 1889.

Application filed January 25, 1888. Serial No. 262,192. (No model.) Patented in England March 3, 1887, No. 3,251; in France January 14, 1888, No. 188,140; in Belgium January 20, 1888, No. 80,325; in Victoria February 28, 1888, No. 5,652, and in New South Wales March 1, 1888, No. 520.

*To all whom it may concern:*

Be it known that I, FREDERICK CHARLES LYNDE, a subject of the Queen of Great Britain, residing at Manchester, in the county of Lancaster, England, have invented an Improved Coin-Controlled Indicating Apparatus, (for which I have obtained British Patent No. 3,251, dated March 3, 1887; French Patent No. 188,140, dated January 14, 1888; Belgian Patent No. 80,325, dated January 20, 1888; New South Wales Patent No. 520, dated March 1, 1888, and Victorian Patent No. 5,652, dated February 28, 1888,) of which the following is a specification.

This invention is applicable to "automatic" machines for indicating weight, pressure, or other similar force or measurement (such as height) on prepayment of a coin, and relates to machines provided with a dial or other graduated scale and an index or finger.

The invention consists in an index finger or pointer so concealed that, although the machines to which the indicator is applied operate the said indicator in the usual way, the position of the said index or pointer is unseen until a coin has been placed in the apparatus and has completed an electric circuit, so that a spark or sparks may be generated, which will show the position of the index or pointer for a suitable and limited length of time, the coin being then caused to fall into a convenient receptacle, and by breaking the electric circuit to again conceal the index or finger until another coin is placed in the apparatus.

It will be obvious to any person practically acquainted with electrical apparatus that a very great many different arrangements may be made for causing the presence of the proper coin to make the metallic contact necessary for completing the electric circuit, and thus developing the said spark without departing from the principal novel feature of my invention; but for the sake of illustration I will here describe a simple arrangement which may be applied to an ordinary weighing-machine which works in any known manner and indicates the weight by means of an index or pointer moving in proximity to a graduated dial.

On the annexed drawings, Figure 1 is a view of so much of a platform weighing-machine (with a dial and movable index-finger) as is necessary to illustrate my invention, the frame or casing of the electric-contact-making apparatus being shown in section. Fig. 2 shows (enlarged) one position of the coin-box, hereinafter described. Fig. 3 shows the corresponding position of the mercury-connection, hereinafter described, and also drawn to a larger scale. Fig. 4 shows another position, hereinafter referred to, of the said coin-box.

In order to apply my invention to a weighing-machine such as illustrated by Fig. 1, I do not alter the mechanism which actuates the movable finger of the indicator in any way. I have therefore not drawn such mechanism, which may be of any well-known construction; but I have merely shown the platform $a$ and the pillar or support $b$ for the dial or scale $c$. I fix an opaque mask or disk, $d$, in front of the index or finger, (shown dotted at $e$,) so as to entirely conceal the same. If there is a glass in front of the dial or scale $c$ $c$, this mask may be made by painting on the back of the glass. The index or finger $e$ of the weighing-machine moves behind this mask $d$, so as to indicate the weight when any article or person is placed on the platform, but is not visible until an electric spark is caused to issue from the point thereof across or to the numeral opposite to which the finger stops. For this purpose the axle $f$, which turns with the finger $e$, is in electric connection with one of the wires, $g'$, leading from a battery, $k$, by means of a disk, $g$, which revolves in mercury contained in a metal trough, $g^2$, to which the wire $g'$ is connected. The dial is provided with a ring of metal, $h$, insulated from the shaft $f$ and finger $e$, and this ring $h$ is placed in electric connection with the other wire, $h'$. There is a breach of continuity in the wire $k'$, leading to or from the battery $k$, so that the electric circuit is not completed, and although the presence of a weight on the platform $a$ of the machine will be indicated by the movement of the index or finger $e$ in the usual manner, yet, in consequence of the said finger $e$ being behind the mask $d$, such movement will not be visible; but on the introduction of the proper coin into the apparatus the electric circuit will be completed, and a spark or a succession of sparks will be given out from the index or finger e to the point on the ring h opposite to the numeral on the dial or scale c to which the index or finger e is pointing at that particular time, and this electric spark or sparks will thus indicate the weight which has been sustained by the mechanical portion of the machine.

In the case illustrated the coin is placed through a slit into a chute, l, and falls into a small box, m. (Shown in perspective view at Fig. 2.) This box m is supported by a cord, n, or its equivalent, passing over a pulley, o, and having a counterbalance-weight, p, attached to its other end, which is sufficiently heavy to raise the box m when empty and support it in the position shown in full lines on Fig. 1. When the coin falls into the box, it overcomes the counterbalance-weight p and causes the box to descend, being guided by the fixed wires q or equivalent means. At the side of the box m there is a small perforated arm, r, through which passes a cord, S, which has a knot or button, S', and to the lower end of which is attached a forked or bent piece of metal, t t. (See Fig. 3.) As the box m descends, the arms or ends of this fork t descend into mercury contained in two glass tubes, t'. The wires k' from the battery k dip into or are otherwise connected with the mercury and the electric circuit is completed, and a series of sparks is caused to pass from the end of the finger or index e to the opposite point on the metal ring h, (or vice versa,) and thus indicate the numeral to which the finger e is pointing.

When the box m arrives at its lowest point, as shown by dotted lines in Fig. 1, a plunger, u, having an inclined upper surface, which forms the bottom of the box, (see Fig. 4,) comes in contact with a fixed part of the apparatus, and, being pushed upward, lifts the coin out of the box, which then slides off the plunger into a suitable receptacle, $m^\times$. The box m, being thus lightened of its load, is then drawn back by the counter-balance p into its original position. As soon as the arm r arrives at the knot or button S' on the cord S, it causes the same to lift the fork t t out of the mercury, and thus disconnects the wires k' and breaks the circuit, (see Figs. 2 and 3,) and the discharge of electric sparks, and consequently the visible indication, will cease.

I would here remark that, if preferred, the coin may be introduced into the apparatus by means of a coin-slide such as was patented by myself in the United States of America, dated October 4, 1887, No. 371,145.

Any suitable battery may be employed or other suitable means to generate the requisite electric current.

I prefer to employ radial or revolving indicators, as illustrated; but I reserve to myself the right to apply my invention to indicators wherein the pointer has a sliding motion imparted to it.

It will be evident that the mechanism for completing the electric circuit and the generator of electricity may be in the same casing with the indicator, if preferred. The coin-receptacle herein described and shown I do not herein claim, but have made it the subject of a separate application, filed January 25, 1888, Serial No. 262,191.

I claim as my invention—

1. The combination of a metallic visible scale or dial, an index-finger, and an opaque screen for the latter, with a suitable source of electricity, a circuit therefrom including the index and scale, and a circuit-interrupter, whereby when the circuit is complete a spark or sparks will pass from the index to the scale and indicate their relative positions.

2. In a weighing-machine, the combination of a metallic scale, an index-finger in close proximity thereto, a source of electricity, a circuit therefrom including the index and scale, and a circuit maker and breaker, with a coin-receptacle, and connections between the receptacle and the circuit maker and breaker, whereby on the insertion of a coin the circuit will be completed and the position of the index denoted by an electric spark or sparks.

3. In a weighing-machine, the combination of the dial and the index or pointer in proximity thereto, one fixed and the other movable, with an opaque screen for the moving part, a suitable source of electricity, a circuit therefrom including both the dial and the index, and a circuit maker and breaker in said circuit, whereby the position of the moving part will be indicated by the passage of a spark from the one member to the other, substantially as described.

In testimony whereof I have signed my name to this specification in the presence of two subscribing witnesses.

FRED. C. LYNDE.

Witnesses:
CHARLES A. DAVIES,
JNO. HUGHES.